(12) United States Patent
Tomita

(10) Patent No.: US 6,219,722 B1
(45) Date of Patent: Apr. 17, 2001

(54) HEAD IC AND RECORDING APPARATUS

(75) Inventor: Isamu Tomita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/216,844

(22) Filed: Dec. 21, 1998

(30) Foreign Application Priority Data

Feb. 13, 1998 (JP) .................................................. 10-030774

(51) Int. Cl.$^7$ .................................................. G06F 12/14
(52) U.S. Cl. .............................................. 710/14; 711/154
(58) Field of Search ................................... 711/154, 155; 710/14; 714/798; 713/400

(56) References Cited

U.S. PATENT DOCUMENTS

| | | | |
|---|---|---|---|
| 5,163,132 * | 11/1992 | DuLac et al. | 395/275 |
| 5,195,185 * | 3/1993 | Marenin | 395/325 |
| 5,559,962 * | 9/1996 | Okamura et al. | 395/200 |
| 5,634,070 * | 5/1997 | Robinson | 395/800 |
| 6,088,829 * | 7/2000 | Umemura et al. | 714/798 |

FOREIGN PATENT DOCUMENTS 689 28 054
  T2  8/1997 (DE).

OTHER PUBLICATIONS

*Massenspeicher–Handbuch für Mikrocomputer,*Daniels et al, 1987, pp. 129–132.

*PC–Hardwarebuch, Messmer,*1997, pp. 878–879.

* cited by examiner

*Primary Examiner*—Thomas Lee
*Assistant Examiner*—Nitin Patel
(74) *Attorney, Agent, or Firm*—Arent Fox Kintner Plotkin & Kahn PLLC

(57) ABSTRACT

A register address and control data which were serially transferred from an outside by a serial interface unit are received, the received head address is stored into a head address control register, and a head selection signal corresponding to the head address is outputted. When the setting of an automatic head switching mode is received from the outside, an automatic head switching control unit automatically switches the contents of the head address control register and sequentially outputs the head selection signals to a plurality of heads synchronously with a write gate signal (WRGT signal) E8 to instruct the writing operation from the outside.

20 Claims, 13 Drawing Sheets

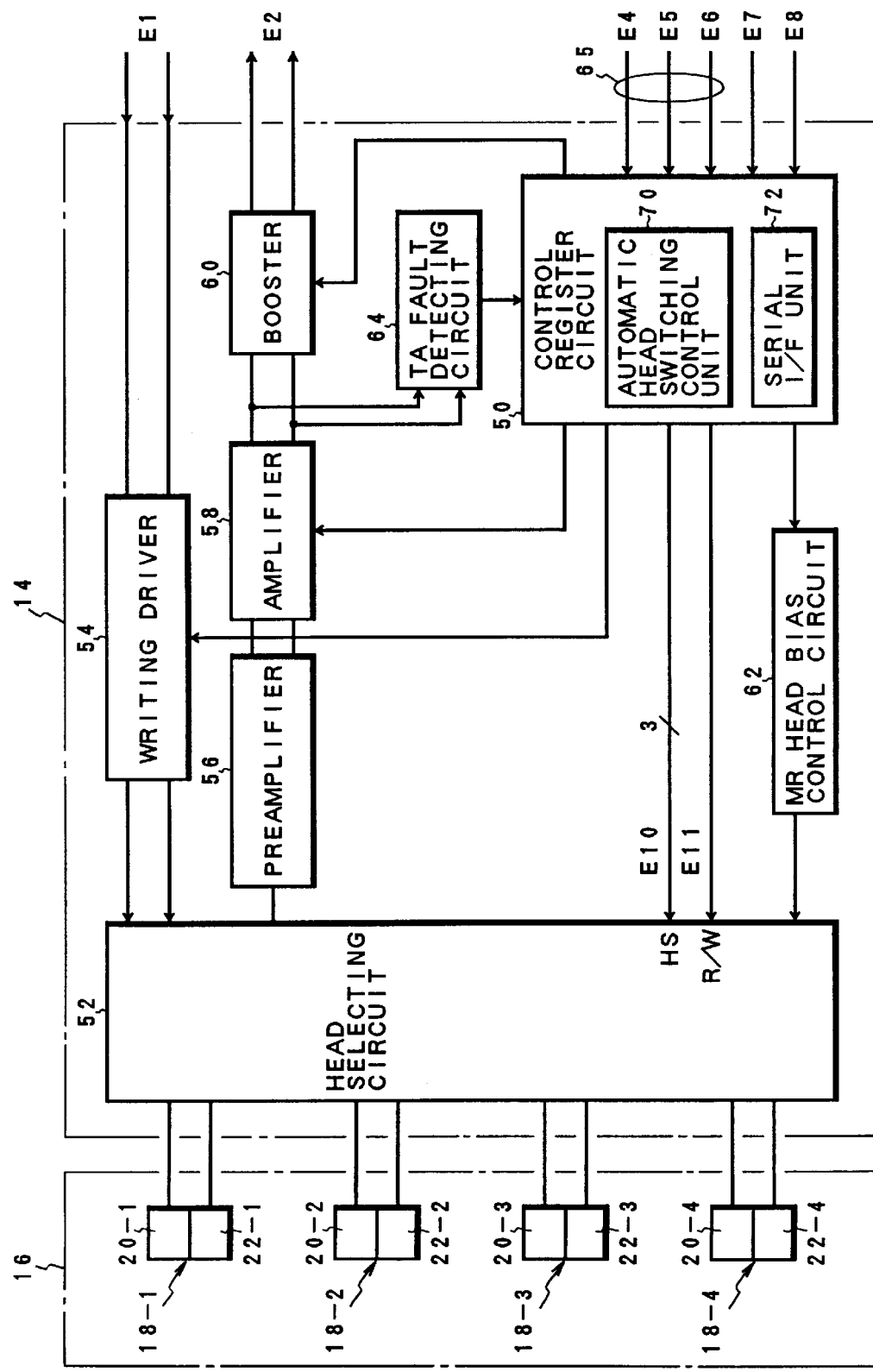

SERIAL DATA ENABLE SIGNAL
(SDEN SIGNAL) E5

SERIAL TRANSFER CLOCK SIGNAL
(SCLK SIGNAL) E4

SERIAL TRANSFER DATA SIGNAL
(SDATA SIGNAL) E6

FIG. 8A WRGT SIGNAL E8
FIG. 8B SDEN SIGNAL E5
FIG. 8C SDATA SIGNAL E6
FIG. 8D HEAD 18-1
FIG. 8E HEAD 18-2
FIG. 8F HEAD 18-3
FIG. 8G HEAD 18-4

F I G. 9
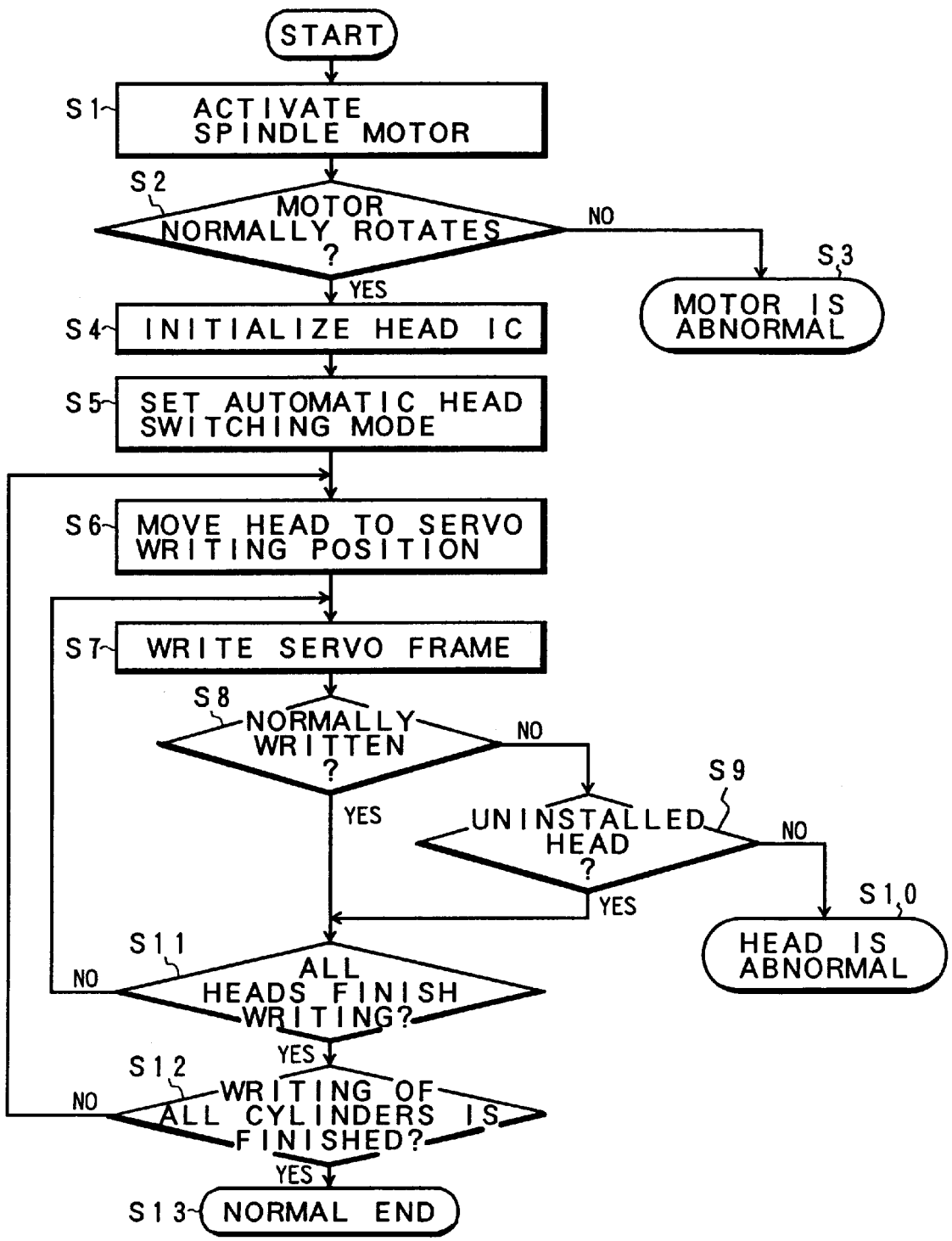

HEAD IC AND RECORDING APPARATUS

BACKGROUND OF THE INVENTION

The present invention relates to a head IC and a recording apparatus for recording and reproducing information by switching a plurality of heads arranged in correspondence to a plurality of medium surfaces. More particularly, the invention relates to a head IC and a recording apparatus having an operating function as a servo writer for recording servo information onto a medium surface.

In recent years, an MR head is used as a read head in association with an increase in capacity of a magnetic disk apparatus. In case of using the MR head, there is a phenomenon called a thermal asperity (hereinbelow, called "TA") such that a magnetic disk medium and the head come into contact with each other, a temperature of an MR device rises, and a DC component in a reproduction output of the MR head largely fluctuates. There is a problem such that reproduction outputs of the heads of tens of bytes become abnormal and original data cannot be reconstructed even if an ECC or the like is used. As countermeasures for the TA, a method of raising a cut-off frequency of a head IC or a read channel circuit when the TA occurs and promoting a convergence of a fluctuation in the DC components, a method of compensating by oppositely adding a DC fluctuation amount, a method of fixing a gain of an AGC amplifier when the TA occurs, a method of fixing a frequency of a PLL in the read channel circuit, a method of specifying an error occurrence position by the TA and enhancing an ECC capability, and the like are considered. Among those TA countermeasures, in the method of changing the cut-off frequency or the method of cancelling the DC components, if such a method is executed in the head IC rather than in the read channel circuit, it is more advantageous with respect to a point of assurance of a dynamic range of an input amplifier of the read channel circuit. Therefore, functions of changing the cut-off frequency and cancelling the DC components are provided in the head IC.

Hitherto, as control signals for the head IC, only a plurality of head selection signals, a chip selection signal, an R/W signal for switching operating modes of reading and writing, and the like are necessary. In case of providing the TA countermeasure function in the head IC in order to support the TA countermeasures, however, the number of control signal lines increases, the number of signal lines connecting a control board for controlling a hard disk and a head IC circuit mounted on an FPC on a head actuator side increases, and the number of pins of connectors also increases, so that the costs increase. There has been put into practical use a head IC constructed in a manner such that control registers of the number corresponding to the kinds of controls are provided for the head IC, a register address and control data are transferred through a serial interface, a head selection, a chip selection, a selection of the operating modes for reading and writing can be controlled, and further, a function control of the countermeasures against the TA can be performed on the basis of the storage contents in the control register.

In a magnetic disk apparatus using the head IC which can control the head selection, chip selection, selection of the reading and writing operating modes, and the like by using the serial interface, however, when servo information is written into a magnetic disk medium in an apparatus manufacturing step, there are problems such that it takes time for switching the head by the serial interface and the productivity remarkably deteriorates. Usually, a servo writing to the magnetic disk medium is performed in a clean room by a dedicated writing facility. In order to reduce the costs by shortening a servo writing time and assuring a writing capability, it is requested to reduce the number of writing facilities which are installed. Further, according to the servo writing, servo information is not written on a track unit basis by each head corresponding to the medium surface. A desired head is selected by designating a certain head address and information of one servo frame is written onto the medium surface. After that, the head addresses are sequentially switched for a time interval until the next servo frame, servo information is written while sequentially switching the heads, and servo information of all of the heads is written in one servo frame interval. By a high-speed servo writing such that all of the heads are switched at every servo frame interval and the servo information is sequentially written onto the different medium surfaces while deviating the writing positions, the servo writing time is fairly reduced and the facility capability is enhanced, thereby enabling the costs to be reduced.

With respect to a case of setting the number of heads to four, a case of sequentially designating the head addresses for the head ICs by the serial interface, switching the heads at an interval of one servo frame, and sequentially recording the servo information onto the different medium surfaces will now be considered. First, in case of serially transferring total 16 bits comprising 8 bits of an address and 8 bits of data, when it is assumed that a clock frequency of the serial interface is equal to 20 MHz, a switching time Th that is required for switching the head addresses is at least as follows.

$$Th = 16 \text{ bits} \times 1/(20 \text{ MHz} \times 10^6)$$

$$= 800 \text{ [nsec]}$$

The switching time Th is a time which can be sufficiently ignored in case of executing the ordinary reading or writing operation. In the high-speed servo writing for switching all of the heads at one servo frame interval and sequentially writing the servo information onto the different medium surfaces while deviating the writing positions, however, the switching time Th cannot be ignored. In the high-speed servo writing, an example where a servo sampling period is equal to 40 μsec (25 kHz) and a servo frame length is equal to 9.5 μsec will be considered. Since an allocating time per head is equal to (40 μsec/4 heads)=10 μsec and the servo frame length is equal to 9.5 μsec, only a time of 0.5 μsec (500 nsec) is permitted for the head switching. On the contrary, in the head selection using the serial interface, a switching time of 800 nsec is necessary only for a serial transfer and there is, consequently, a problem such that the servo information of all of the heads cannot be written within one servo frame.

SUMMARY OF THE INVENTION

According to the invention, there are provided a head IC and a recording apparatus which can perform a high-speed head switching in a servo writing mode without being restricted by a serial transfer time.

According to the invention, there is provided a head IC for recording and reproducing information by switching a plurality of heads arranged in correspondence to a plurality of medium surfaces, comprising: a serial interface unit for receiving a register address and control data which are serially transferred from the outside; a head address control register for storing the control data which is designated by the head address received by the serial interface unit and received and for outputting a head selection signal based on the control data; and an automatic head switching control unit for automatically switching the contents of the head address control register synchronously with a write gate signal (WRGT signal) from the outside which instructs a writing operation and sequentially outputting the head selection signals for the plurality of heads when an automatic head switching mode is set from the outside. In the head IC of the invention as mentioned above, when the automatic head switching mode is set and the writing operation is executed by the write gate signal, the head is automatically switched by using the end of execution of the writing operation serving as a timing when the write gate signal rises as a trigger. Since the head can be switched without accompanying data transfer by the serial interface, the head switching time can be shortened. Consequently, even in the head IC having a serial transfer function, a high-speed servo writing for switching all of the heads at one servo frame interval and sequentially writing the servo information onto the different medium surfaces while deviating the writing position can be also certainly performed. The costs can be decreased by the reduction of the servo writing time.

The automatic head switching control unit increases the head address one by one at every timing when the write gate signal is false (negate: H level) by using the minimum value of the head address as an initial value. When the write gate signal is false in the case where the head address is equal to the maximum value corresponding to the number of heads which can be installed, the next head address is set to the minimum value. Thus, the sequential switching from the minimum value of the head address to the maximum value is automatically executed synchronously with the write gate signal at one servo frame interval. On the contrary, the automatic head switching control unit decreases the head address one by one every timing when the write gate signal is false by using the maximum value of the head address corresponding to the number of heads which can be installed as an initial value. When the write gate signal is false in the case where the head address is equal to the minimum value of the head address, the next head address can be also set to the maximum value. The automatic head switching control unit makes a writing driver operative and supplies a writing current to the head in which the head address has been switched at a timing when the write gate signal instructing the writing operation is true (assert: L level). In a period during which the write gate signal is true, the servo information is written into a medium. The automatic head switching control unit also has a control register for setting an automatic switching mode and sets and resets the automatic head switching mode on the basis of a storage result of the control data which was received by the serial interface unit and in which the register address of the control register for setting the automatic switching mode has been designated from the outside. The automatic head switching control unit can also have a terminal for receiving an input of a setting signal of an automatic head switching mode from the outside and a mode setting unit for setting and resetting the automatic head switching mode on the basis of a signal polarity of the terminal. The automatic head switching control unit recognizes installation or uninstallation of the plurality of heads and inhibits the writing operation to uninstalled heads when the uninstalled heads are selected by the switching of the head address by the write gate signal. Further, the automatic head switching control unit can be also constructed in a manner such that installation or uninstallation of the plurality of heads is recognized and in the switching of the head address by the write gate signal, the uninstalled head address is skipped and the uninstalled heads are not selected.

According to the invention, there is also provided a recording apparatus such as a magnetic disk apparatus or the like, comprising: a head IC for recording and reproducing information by switching a plurality of heads arranged in correspondence to a plurality of recording medium surfaces; and a control board for recording and reproducing information to/from a recording medium by the head via the head IC. The head IC in the recording apparatus comprises: a serial interface unit for receiving a register address and control data which are serially transferred from the control board; a head address control register for storing the control data which was designated by the register address received by the serial interface unit and received and outputting a head selection signal on the basis of the control data; and an automatic head switching control unit for automatically switching the head address control register synchronously with the write gate signal from the control board which instructs the writing operation and sequentially outputting the head selection signals to the plurality of heads when the automatic head switching mode is set from the control board. The control board has a servo writing processing unit for setting the automatic head switching mode into the head IC, sequentially selecting all of the heads, and sequentially writing servo information to each of the corresponding recording surfaces within one servo sampling period. The servo writing processing unit of the control board has an uninstalled head table in which uninstalled heads have been registered and ignores a write error occurring in the head address registered in the uninstalled table. Further, the servo writing processing unit of the control board inhibits the switching of the head address for the head IC using the serial interface until the writing of the servo information to all of cylinders of the plurality of medium recording surfaces by the sequential selection of all of the heads is completed. Thus, only the head switching in the automatic head switching mode is valid during the servo writing operation. The details of the head IC in the recording apparatus are the same as those of the recording apparatus.

The above and other objects, features, and advantages of the present invention will become more apparent from the following detailed description with reference to the drawings.

BRIEF DESCRIPTION OF THE DRAWINGS

FIG. 4 is a circuit block diagram of a head IC according to the invention;

FIG. 9 is a flowchart for an automatic head switching control according to the invention;

DETAILED DESCRIPTION OF THE PREFERRED EMBODIMENTS

Figure 1:
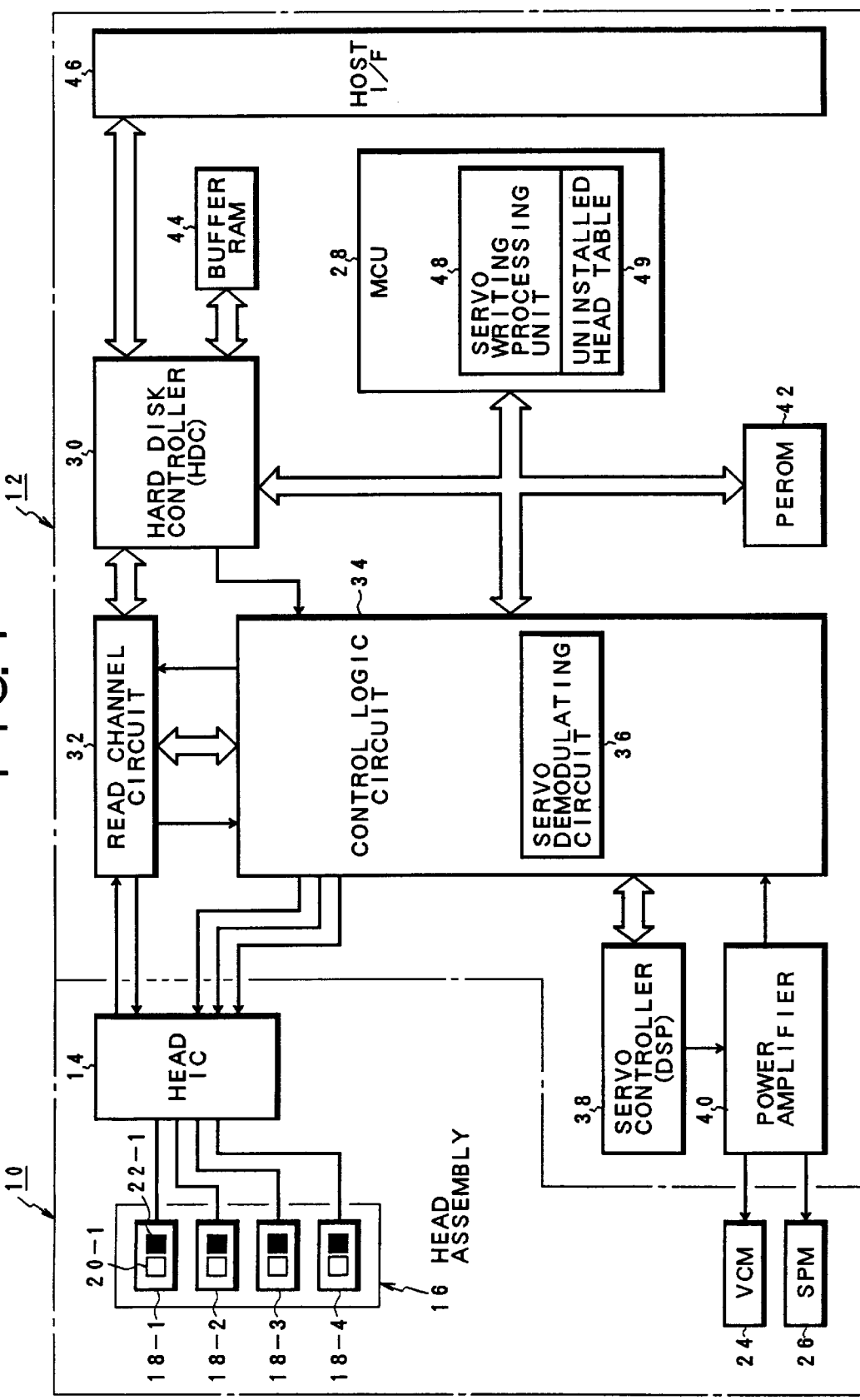
FIG. 1 is a block diagram of an optical disk apparatus to which the invention is applied.

FIG. 1 shows an embodiment of a recording apparatus to which the invention is applied and relates to an example of a magnetic disk apparatus known as a hard disk drive (HDD). The magnetic disk apparatus is constructed by a disk enclosure 10 and a control board 12. The disk enclosure 10 has a head IC 14 of the invention, a head assembly 16, a voice coil motor (hereinafter, abbreviated to a "VCM") 24, and a spindle motor 26. The head IC 14 has functions for receiving the setting of a register address and control data by a serial transfer from the control board 12 and for performing a chip selection, a selection of operating modes for writing and reading, a head selection, a write current setting, and a setting of a sense current of an MR head which is used as a reading head, or the like. Further, the head IC 14 of the invention has a function for automatically switching the head selection synchronously with a write gate signal from the control board 12 by the setting of an automatic head switching mode. The control function of the automatic head selection can be switched at a high speed synchronously with the write gate signal by a dedicated signal line irrespective of the serial transfer from the control board 12. In the embodiment, four heads 18-1 to 18-4 are provided for the head assembly 16. Writing heads 20-1 to 20-4 using inductive heads and MR heads 22-1 to 22-4 serving as reading heads are provided for the heads 18-1 to 18-4.

Figure 2:
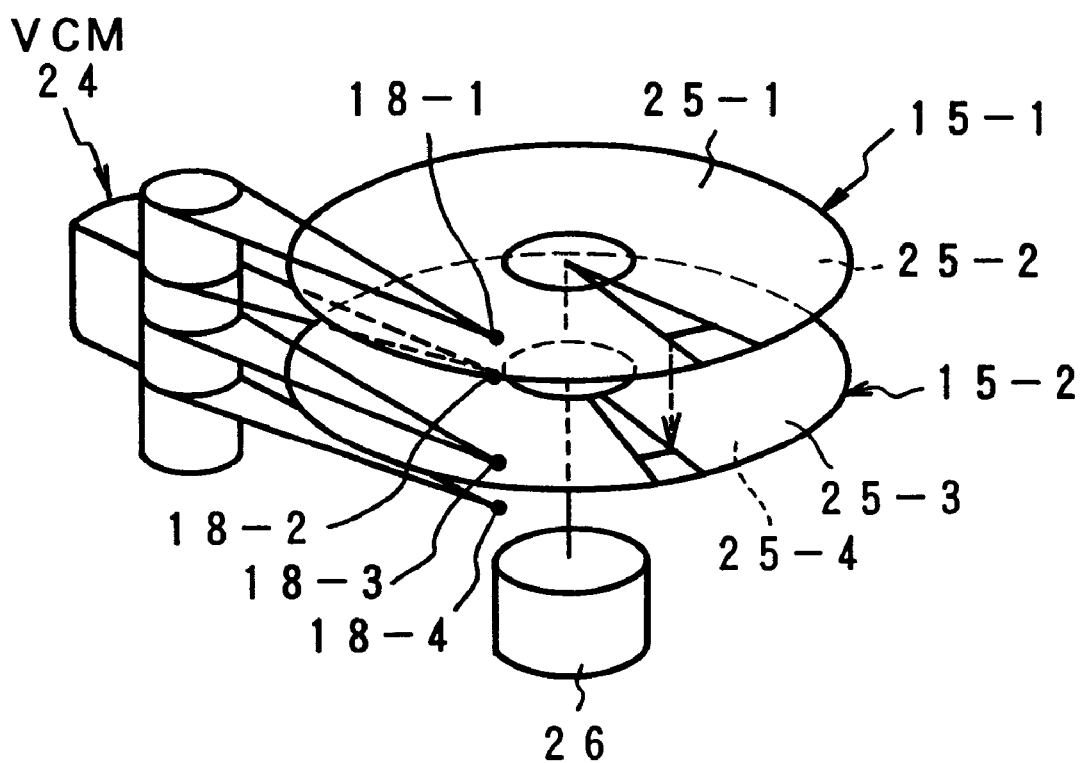
FIG. 2 is a schematic structural diagram of a disk enclosure in FIG. 1.

As shown in a schematic structure of the disk enclosure 10 for the magnetic disk medium in FIG. 2, the heads 18-1 to 18-4 of the number corresponding to the number of recording medium surfaces are provided. That is, the four heads 18-1 to 18-4 are provided for the tips of head arms provided so as to be rotatable by the VCM 24, respectively. The heads 18-1 to 18-4 face medium surfaces 25-1 to 25-4 of two magnetic disk media 15-1 and 15-2 which are rotated by the spindle motor 26 and record and reproduce information, respectively.

Referring again to FIG. 1, the control board 12 comprises: a microcontrol unit (hereinafter, abbreviated to an "MCU") 28; a hard disk controller (HDC) 30; a read channel circuit (RDC) 32; a control logic circuit 34 having a servo demodulating circuit 36; a servo controller 38 using a DSP; a power amplifier 40; a PEROM 42 serving as a non-volatile memory; a buffer RAM 44 using a DRAM; and a host interface 46 to transmit and receive information to/from a host. When a write access is received from the host, the MCU 28 stores write data into the buffer RAM 44 and, after that, generates a write gate signal from the hard disk controller 30 to the read channel circuit 32, thereby setting the read channel circuit into a write operating mode. At the same time, the MCU 28 instructs the chip selection, write operating mode, and head selection to the head IC 14 via the control logic circuit 34 by the serial transfer and likewise sets it into the write operating mode. Subsequently, after the write data in the buffer RAM 44 was ECC encoded by the hard disk controller 30, NRZ write data is 8/9 converted by the read channel circuit 32 and a precode of 1/(1–D) is written and a compensation is executed. After that, the resultant data is supplied to the head IC 14 and is converted into a write current by a writing driver and is written into the disk medium by any one of the writing heads 20-1 to 20-4 in the head assembly 16 which has been selected at that time. Even upon writing, servo information included in a read signal from the MR head provided in any one of the heads 18-1 to 18-4 selected in the head IC 14 is demodulated by the servo demodulating circuit 36 provided in the control logic circuit 34. A head positioning control to position the head to a cylinder address at that time by the servo controller 38 is performed by the driving of the VCM 24. When a read access is received from the host, the MCU 28 activates the hard disk controller 30 and outputs a read gate signal to the read channel circuit 32, thereby forming a read operating mode. At the same time, the MCU 28 instructs the chip selection, read operating mode selection, and head selection to the head IC 14 by the serial transfer through the control logic circuit 34, selects a reading head, namely, an MR head designated by the read access, thereby setting a read operating mode. A read signal from the MR head selected among the heads 18-1 to 18-4 of the head assembly 16 in the read operating mode of the head IC 14 is amplified by an amplifier in the head IC 14 and is, thereafter, supplied to the read channel circuit 32. With respect to the read signal inputted from the head IC 14, the read channel circuit 32 executes, for example, an equalization for maximum likelihood detection of partial response class 4, thereafter, performs a Viterbi detection, and performs a conversion of (1–D) corresponding to the precode upon writing. After that, the read channel circuit 32 executes an 8/9 inverse conversion, demodulates the NRZ data, and outputs to the hard disk controller 30. The hard disk controller 30 executes an ECC decoding process with regard to the demodulation data from the read channel circuit 32. If the demodulation data is error correctable data, an error correction is performed and, after that, the read data is transferred from the host interface 46 to the host via the buffer RAM 44. In addition to such an operation for ordinary recording and reproduction, according to the invention, a servo writing processing unit 48 and an uninstalled head table 49 are provided for the MCU 28 of the control board. The servo writing processing unit 48 executes a servo writing for writing servo information to the recording medium surfaces 25-1 to 25-4 of the magnetic disk media 15-1 and 15-2 in FIG. 2 at the manufacturing stage of the hard disk drive. For the servo writing, a dedicated servo writer is prepared in a clean room. By setting the servo writer for the host interface 46 and supplying a control command to the control board 12, the servo writing processing unit 48 is activated. The servo data which is likewise supplied as write data via the host interface 46 is written into the disk medium. Information regarding the uninstalled heads among the heads which can be connected to the head IC 14 provided for the disk enclosure 10 has previously been registered in the uninstalled head table 49. For example, when the number of heads which can be connected to the head IC 14 is equal to 8, since only the four heads 18-1 to 18-4 are installed in the embodiment, an installation flag is registered in the uninstalled head table 49 with respect to head numbers HH=01 to 04. An uninstallation flag is registered in the table 49 with respect to head numbers HH=05 to 08. In the case where the uninstalled heads are selected and the servo information is written by the servo writing processing unit 48, the uninstalled head table 49 is subjected to a write error. However, if there is the uninstallation flag for the write error with reference to the uninstalled head table 49, the write error is ignored and the writing of the servo information by the selection of the next head is continued without interrupting the process.

Figure 3:
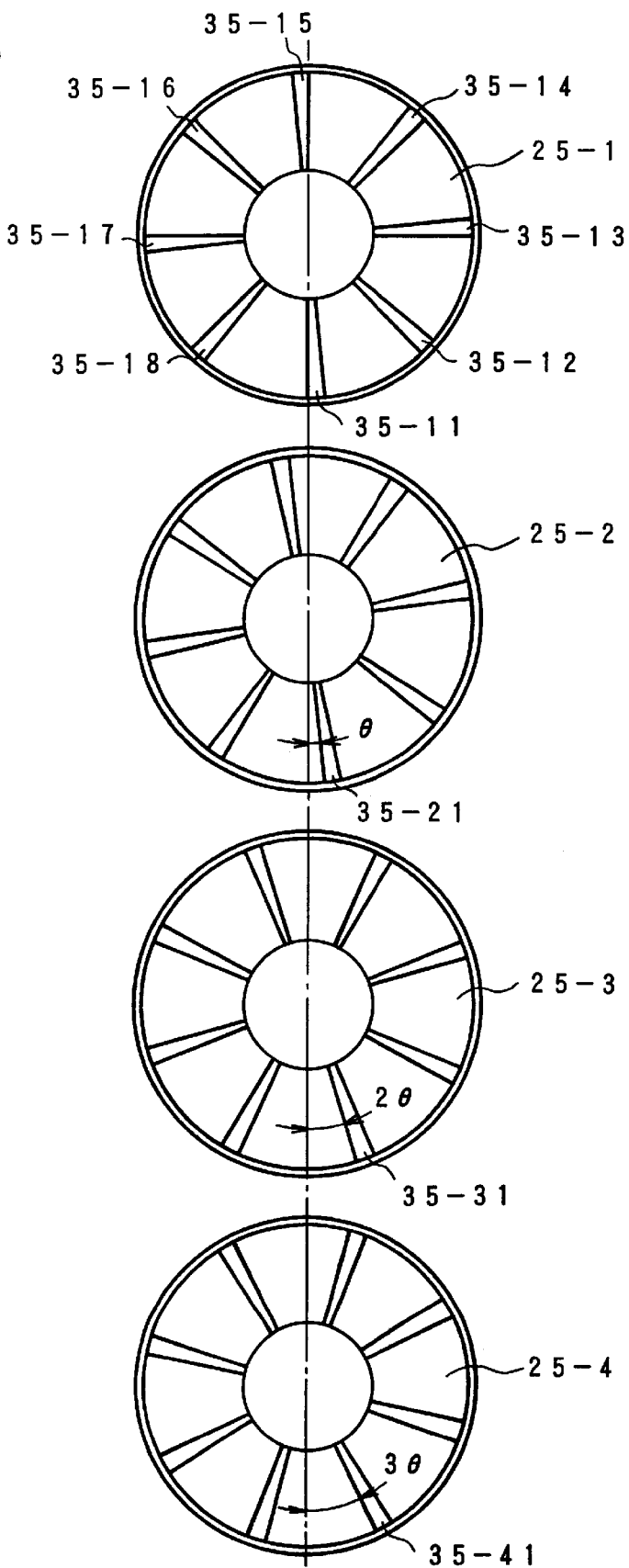
FIG. 3 is an explanatory diagram of recording states of servo information to recording medium surfaces in FIG. 2.

A recording state of the servo information which is recorded to the medium surface of the magnetic disk by the servo writing processing unit 48 of the MCU 28 is as shown in FIG. 3. FIG. 3 translucently shows the four medium surfaces 25-1 to 25-4 of the two magnetic disk media 15-1 and 15-2 in FIG. 2 when they are seen from the top. First, when the medium surface 25-1 locating at the top is seen, for example, it is divided into eight portions at intervals of 45° with respect to the tracks in the circumferential direction, so that servo information regions 35-11 to 35-18 are formed. A period to write the servo information regions 35-11 to 35-18 is set to one servo frame period (interval) T0. In the recording of the servo information of the invention, the heads 18-1 to 18-4 are sequentially switched and the servo information is recorded in accordance with the order of the medium surfaces 25-1, 25-2, 25-3, and 25-4. That is, when the servo information is written to a certain track in the servo information region 35-11 of the medium surface 25-1, the head is switched to the head of the medium surface 25-2 and the servo information is written into a servo information region 35-21 from the position that is deviated by only a rotational angle θ. Subsequently, the head is switched to the head of the medium surface 25-3 and the servo information is written into a servo information region 35-31 serving as a position that is deviated by a rotational angle θ. Further, the head is switched to the head of the medium surface 25-4 and the servo information is written into a servo information region 35-41 serving as a position that is deviated by a rotational angle θ. After the servo information was written into the servo information region 35-41, the head is again returned to the head of the first medium surface 25-1. The writing operation of the servo information in the next servo information region 35-12 is repeated. In a manner similar to the above, the above operations are repeated a number of times corresponding to one track. After completion of the writing by the head switching of the servo information of one track, the cylinder address is switched and the above operations are similarly executed for the next track. Those processes are repeated up to the final cylinder.

FIG. 4 is a circuit block diagram of the head IC 14 of the invention provided on the disk enclosure 10 side in FIG. 1. The head IC 14 has a control register circuit 50, a head selecting circuit 52, a writing driver 54, a preamplifier 56, an amplifier 58, a booster 60, an MR head bias control circuit 62, and a TA fault detecting circuit 64. An automatic head switching control unit 70 and a serial interface unit 72 are provided for the control register circuit 50. A serial transfer line 65 using three signal lines is connected from the control board 12 side in FIG. 1 to the serial interface unit 72 provided for the control register circuit 50. The serial transfer line 65 supplies a serial transfer clock signal E4, a serial data enable signal E5, and a serial transfer data signal E6.

Figure 5A:
FIGS. 5A to 5C are functional block diagrams of a control register circuit in FIG. 4.
Figure 5B:
Figure 5C:
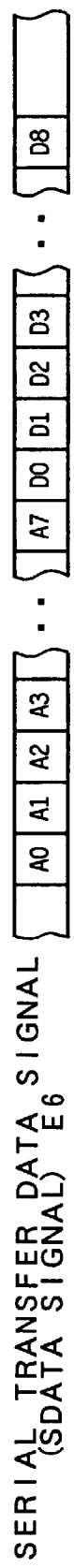

The serial transfer operation for the serial interface unit 72 is as shown in timing charts of FIGS. 5A to 5C. The serial data enable signal E5 in FIG. 5A is enabled to the high level at the time of the serial transfer operation. Synchronously with it, the serial transfer clock signal E4 is outputted as shown in FIG. 5B. Synchronously with the serial transfer clock signal E4, the serial transfer data signal E6 is outputted as shown in FIG. 5C. The serial transfer data signal E6 serially transfers total 16 bits comprising, for example, 8 bits of addresses A0 to A7 and subsequent 8 bits of control data D0 to D7.

Referring again to FIG. 4, when the serial data transfer as shown in FIGS. 5A to 5C from the control board 12 side is received, the serial interface unit 72 stores the received control data D0 to D7 into a control register designated by the received addresses A0 to A7, thereby enabling the chip selection, reading or writing operating mode, head selection, setting control of the sense current for the MR head, recovery control for the occurrence of the TA, and the like on the basis of the contents stored in the register. The mode selection of the reading operation and writing operation in the head IC 14 is executed by a read/write switching signal E7. The automatic head switching control unit 70 operates, for example, when the automatic head switching mode is set by the setting of the control register due to the serial transfer by the serial transfer line 65, and automatically sequentially switches the heads 18-1 to 18-4 synchronously with a write gate signal E8 which is supplied from the control board 12 side and is used to perform the write control of the servo information. When the writing operation is set by the read/write switching signal E7 for the control register circuit 50, the writing driver 54 is made operative. In response to a write data signal E1 which is supplied from the control board 12 side, the writing driver 54 supplies a write current to any one of the writing heads 20-1 to 20-4 selected by a head selection signal E10 at that time, thereby performing the writing to the magnetic disk medium. The selection between the reading head and the writing head in the head selecting circuit 52 is performed by a read/write selection signal E11 from the control register circuit 50. When the reading operation is set into the control register circuit 50 by the read/write switching signal E7, the writing driver 54 is turned off. The read signal from the MR head selected by the head selection signal E10 and read/write selection signal E11 is amplified by the preamplifier 56 and amplifier 58 and is outputted as a read signal E2 to the control board side through the booster 60. Upon reading, on the basis of the serial transfer to the control register circuit 50, the MR head bias control circuit 62 determines the sense current which is supplied to the MR head. Further, the output of the amplifier 58 is inputted to the TA fault detecting circuit 64. The TA fault detecting circuit 64 detects the abnormality when the read signal instantaneously changes by the TA and supplies a TA fault detection signal to the control register circuit 50. By receiving the TA fault detection signal, the control register circuit 50 cuts a DC level by a control for the amplifier 58 and, at the same time, performs a control to switch a cut-off frequency from, for example, 200 kHz in the ordinary state to 2 MHz for the booster 60, thereby suppressing a fluctuation due to the TA and reducing an abnormality fluctuation interval of the signal.

Figure 6:
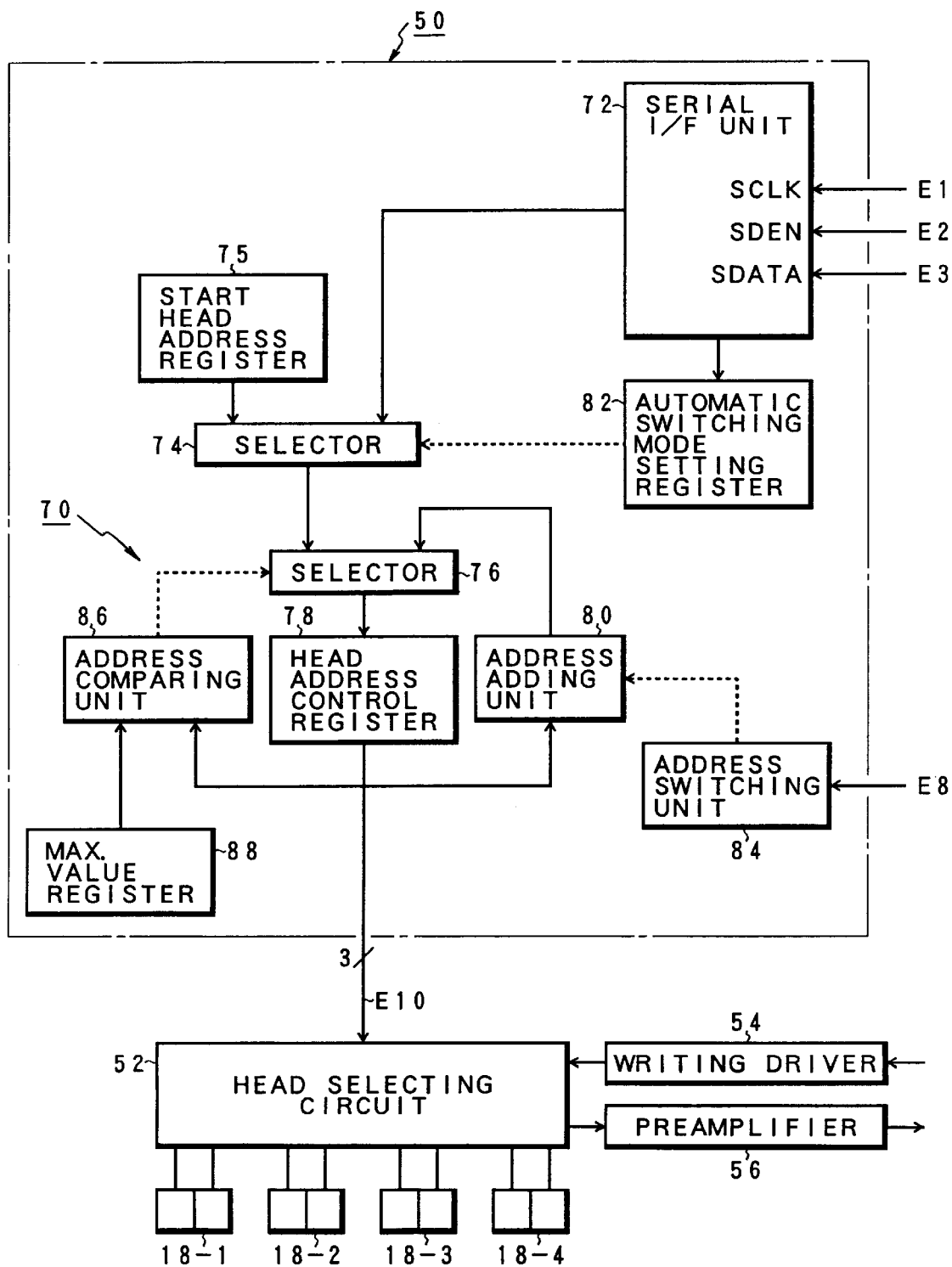
FIG. 6 is a timing chart for a serial transfer in FIG. 4.

FIG. 6 shows a functional block of the automatic head switching control unit 70 provided for the control register circuit 50 in FIG. 4 together with the side of the serial interface unit 72 and the side of the head selecting circuit 52. A head address control register 78 to supply the head selection signal E10 to the head selecting circuit 52 is provided for the control register circuit 50. The head selection signal E10 is information consisting of three parallel bits and, for example, a head address can be set to eight stages of "000" to "111" as a binary number. An output from the serial interface unit 72 is loaded into the head address control register 78 through selectors 74 and 76. In the ordinary mode, the selector 74 selects the output of the serial interface unit 72 and stores the serially transferred head address into the head address control register 78 through the selector 76. The automatic head switching control unit 70 automatically switches an address in the head address control register 78 and includes the selectors 74 and 76 and is further constructed by a start head address register 75, an address adding unit 80, an automatic switching mode setting register 82, an address switching unit 84, an address comparing unit 86, and a maximum value register 88. An initial address upon automatic head switching, namely, in the embodiment, the minimum value of the head address has been fixedly stored in the start head address register 75. On the other hand, the maximum value of the head address has been fixedly stored in the maximum value register 88. The control data is stored in the automatic switching mode setting register 82 by receiving the setting control of the automatic head switching mode by the serial transfer from the control board 12 side for the serial interface unit 72. On the basis of the stored control data, the selector 74 is switched to the start head address register 75 side. In the setting of the automatic head switching mode, therefore, the minimum value, namely, the start address in the start head address register 75 is first stored into the head address control register 78 through the selectors 74 and 76. For example, as a head selection signal E10, the selection of the head number HH=01 is instructed to the head selecting circuit 52. A storage address in the head address control register 78 is switched by the write gate signal E8 from the control board 12 side to the address switching unit 84. That is, when the write gate signal E8 is switched from an asserting state (L level) to a negating state (H level) by the end of the writing of the servo information, the address switching unit 84 generates a switching output to the address adding unit 80. The address adding unit 80 stores the address obtained by adding "1" to the present head address into the head address control register 78 via the selector 76, thereby switching to the next head address. Thus, each time the write gate signal E8 is switched from the asserting state to the negating state, the head address is increased one by one. The heads are automatically switched by the head selecting circuit 52, for instance, in accordance with the order of the head numbers 01, 02, 03, and 04 and the order of the heads 18-1, 18-2, 18-3, and 18-4. The address comparing unit 86 compares the maximum value of the head address in the maximum value register 88, for example, the head No. HH=04 with the head address in the head address control register 78. When the head address coincides with the maximum value, the selector 76 is switched to the start head address register 75 side through the selector 74. At the time of the next head address switching, the initial value in the start head address register 75, namely, the minimum value of the head address is stored into the head address control register 78. Thus, when the last head 18-4 is selected by the head selecting circuit 52, the operation is subsequently returned to the selection of the first head 18-1.

Figure 7:
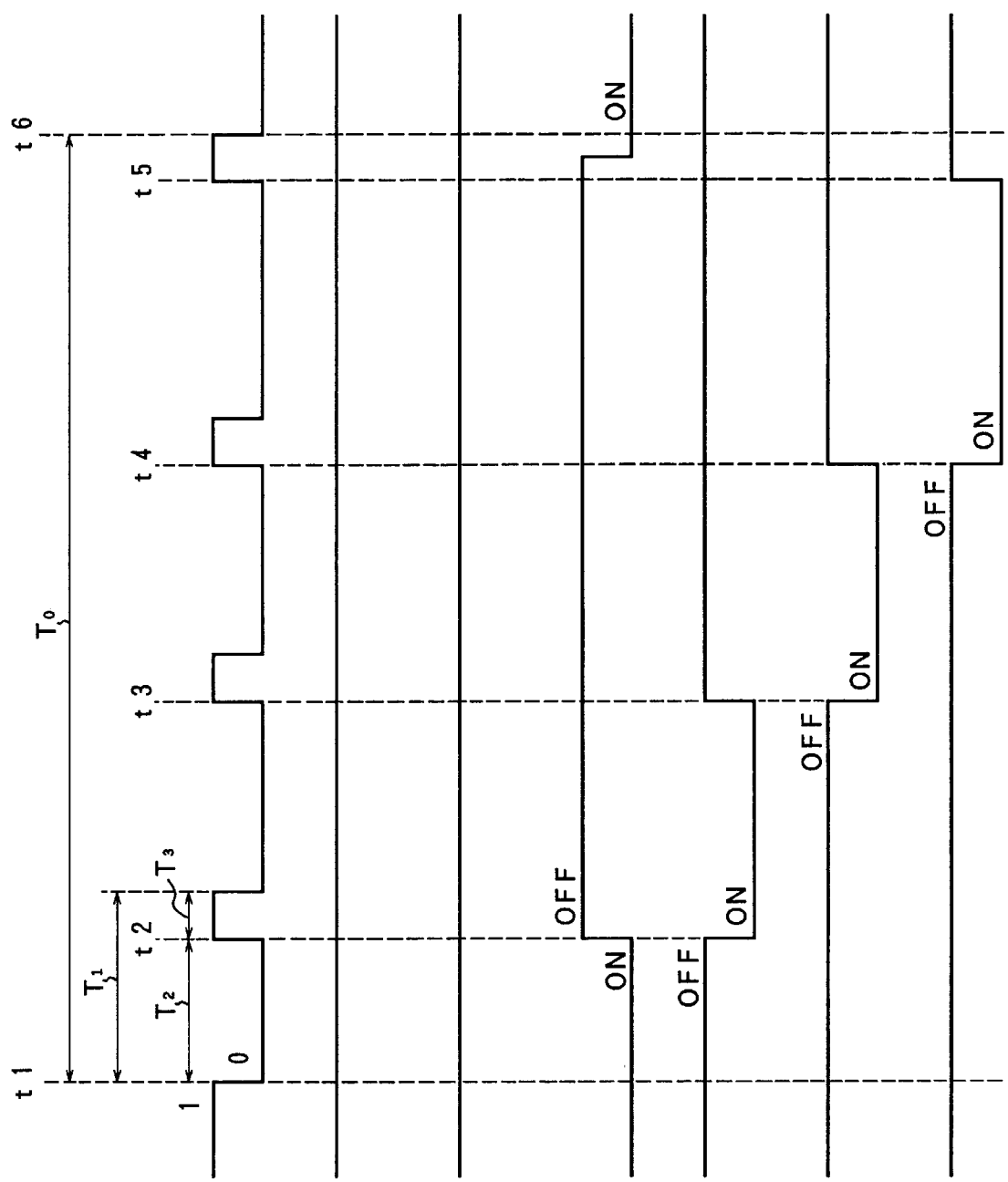
FIGS. 7A to 7G are timing charts for the head switching operation by an automatic head switching control unit in FIG. 6.
Figure 8:
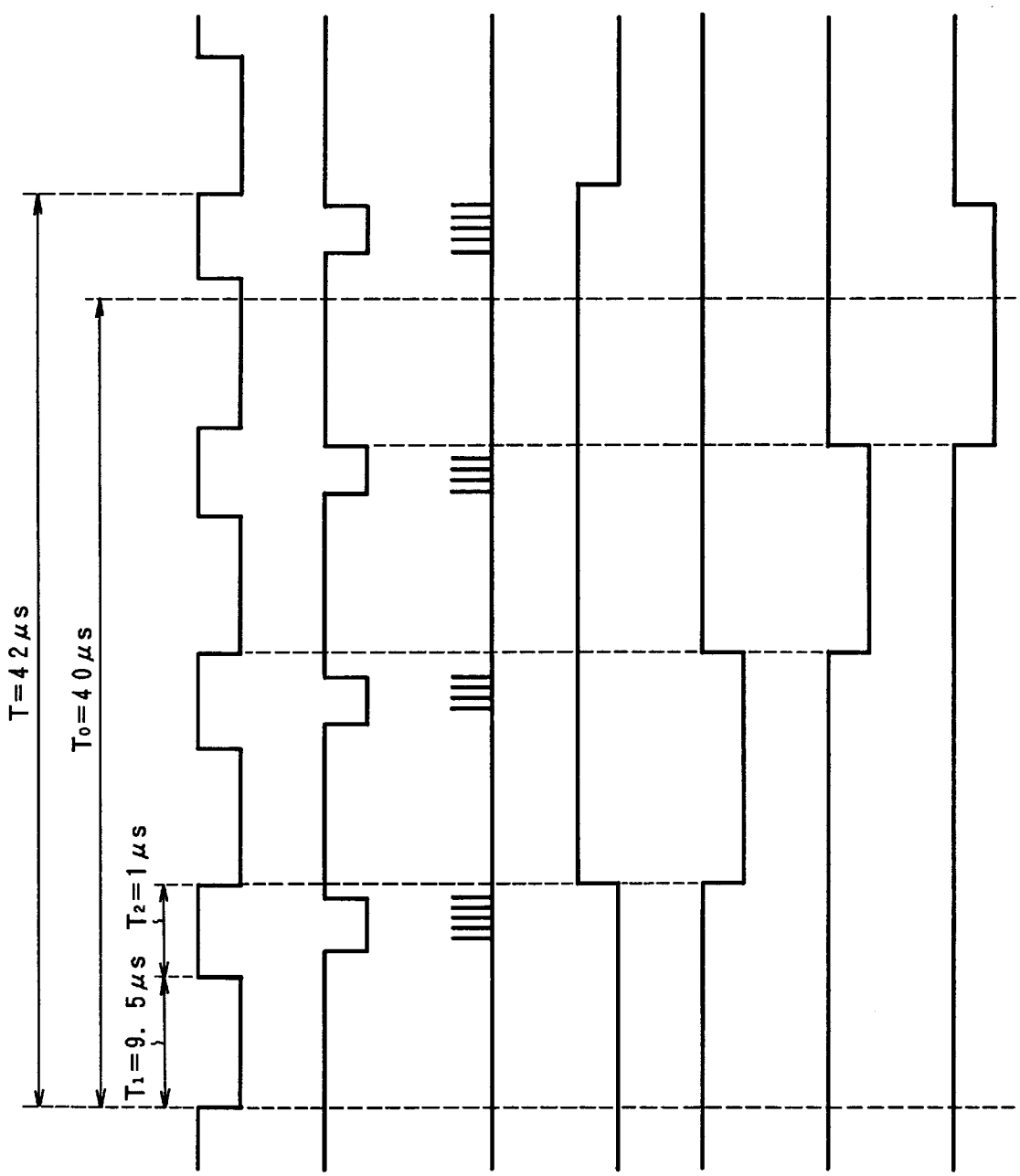
FIGS. 8A to 8G are timing charts for the head switching operation in the ordinary mode in which the automatic head switching mode is cancelled in FIG. 6.

FIGS. 7A to 7G are timing charts for the head switching operation at the time of servo writing by the automatic head switching control unit 70 provided for the control register circuit 50 in FIG. 6. The write gate signal E8 in FIG. 7A is generated once in a period T1 obtained by dividing one servo frame period T0 into four periods in order to sequentially switch the four heads and sequentially write the servo information onto the four recording medium surfaces. In the period T1, the writing operation of the servo information is executed for an asserting period T2 when the write gate signal E8 is at the logical level 0 (L level) and the head switching is executed for a negating period T3 when the write gate signal E8 is subsequently set to the logical level 1 (H level). Now, assuming that the servo frame period T0 is set to T0=40 $\mu$sec, the allocation period T1 per head is equal to T1=10 $\mu$sec. Now, assuming that a servo frame length T2 is equal to T2=9.5 $\mu$sec, an idle time T3 for head switching is equal to T3=0.5 $\mu$sec=500 nsec. As shown in the block diagram of FIG. 6, the head switching in the invention is a switching to the negate of the write gate signal E8, namely, a count-up of the head address synchronized with the rising from the logical level 0 to 1. The head switching is finished in a very short time on the order of a few nanosecond. Even if the idle time T3=500 nsec, there is an enough time. Therefore, as shown in FIGS. 7D to 7G, synchronously with the rising from the logical level 0 to 1 of the write gate signal E8, namely, the switching from the asserting state to the negating state, the switching operations from the head 18-1 to the head 18-2, from the head 18-2 to the head 18-3, from the head 18-3 to the head 18-4, and further, from the head 18-4 to the first head 18-1 are executed at times t2, t3, t4, and t5, respectively. On the other hand, in the case where the automatic head switching control unit 70 is not made operative in FIG. 6 and the head switching is executed by the serial transfer for the serial interface unit 72, the head switching operation is performed as shown in timing charts of FIGS. 8A to 8G. That is, after rising from the asserting state of the logical level 0 of the write gate signal E8 in FIG. 8A to the negating state of the logical level 1, the serial data enable signal E5 in FIG. 8B is set into the enable state from the logical level 1 to 0. Synchronously with it, the address of the control register of 16 bits and the control data are transferred by the serial transfer data signal E6 as shown in FIG. 8C. On the basis of such a serial transfer, the heads 18-1 to 18-4 are sequentially switched as shown in FIGS. 8D to 8G. Now, assuming that one servo frame period T0 is set to T0=40 $\mu$sec in a manner similar to FIGS. 8A to 8G and the servo frame length T1=9.5 $\mu$sec, the time T2 which is required for head switching is equal to T2=1 $\mu$sec. The serial transfer time is included in the head switching time T2. Now, assuming that the serial clock frequency is equal to 20 MHz, the serial transfer time is $$Th = 16 \text{ bits} \times 20/(20 \text{ MHz} \times 10^{-6})$$
$$= 800 \text{ nsec}$$

Now, assuming that the switching time which is necessary for the actual head address is equal to 200 nsec, T2=1 $\mu$sec. Thus, the time T that is necessary for the head switching to write the servo information as much as four heads is equal to T=42 $\mu$sec. However, the head switching time Th=42 $\mu$sec exceeds one servo frame period T0=40 $\mu$sec. As shown in FIG. 4, the servo information corresponding to all of the heads cannot be sequentially written by the switching to the other heads for a period of time to the next servo information region. On the other hand, according to the invention, as shown in timing charts of FIGS. 7A to 7G, all of the heads are switched in the servo frame period T0 by the automatic head switching control and the servo information can be continuously sequentially written to all of the recording medium surfaces.

FIG. 9 is a flowchart for the servo information writing process, namely, servo writing process by the servo writing processing unit 48 provided for the MCU 28 of the control board 12 in FIG. 1. First in step S1, the spindle motor 26 is activated on the basis of the turn-on of the power source. In step S2, a check is made to see if the motor normally rotates. If the motor rotational speed does not reach a normal rotational speed, the processing routine is finished by regarding that the motor is abnormal in step S3. When the normal rotation of the motor is decided, step S4 follows and the head IC 14 is initialized. After that, the automatic head switching mode is set in step S5. In step S7, the servo frame writing control is executed. Specifically speaking, as shown in the timing charts of FIGS. 7A to 7G, the write gate signal E8 is asserted and the servo information is written. When the write gate signal is negated by the end of the writing, the head is automatically switched to the next head. When the writing of the servo information is finished, a check is made to see if the servo information has normally been written in step S8. When it is normally written, step S10 follows and a check is made to see if the writing operation by the switching of all of the heads has been finished. Until the writing for all heads is finished, the processing routine is returned to step S7 and the servo frame by the next head switching is written. If the normal writing is not discriminated in step S8 and a write error occurs, a check is made in step S9 to see if the head is the uninstalled head. Upon checking of the uninstalled head, whether the head is a head having the uninstallation flag or not is discriminated with reference to the uninstalled head table 49. If the head is the uninstalled head, the write error is ignored and the processing routine is returned to step S11 and the next process is executed. If the head is not the uninstalled head, step S10 follows and the processing routine is finished by regarding that the head is abnormal. When the writing for all heads is finished in step S11, step S12 follows and a check is made to see if the writing of all cylinders has been finished. If the writing of all cylinders is not finished, the processing routine is returned to step S6. After the head was moved to the next cylinder position, the writing of the servo information by the head switching in steps S7 to S11 is repeated. When the end of the writing of all cylinders is determined in step S12, the series of servo information writing processes, namely, servo writing is finished as being normal end in step S13.

Figure 10:
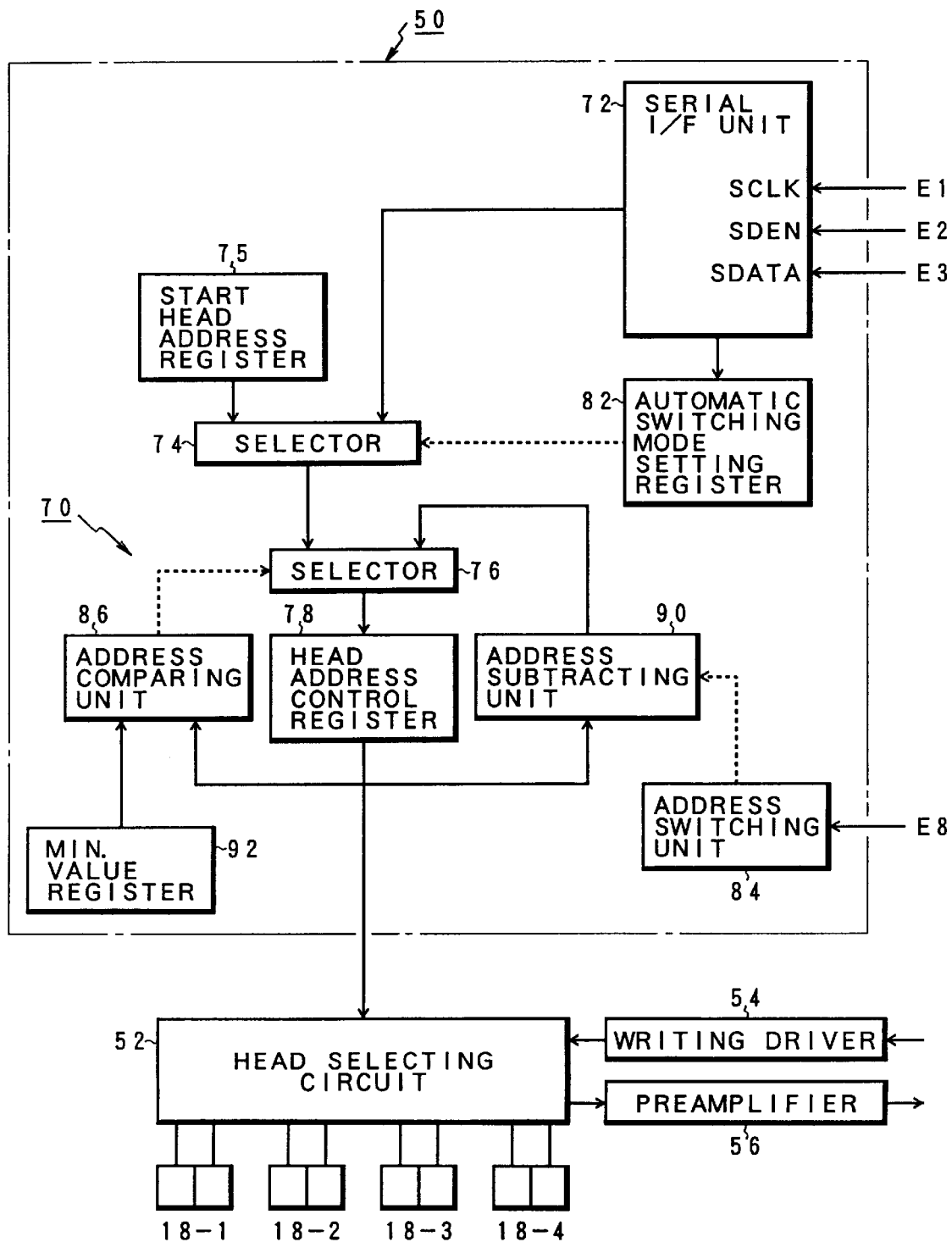
FIG. 10 is a functional block diagram of the control register circuit in FIG. 4 for sequentially reducing a head address.

FIG. 10 shows another embodiment of the automatic head switching control unit 70 provided for the head IC 14 in FIG. 4. In the automatic head switching control unit 70, the switching of the head address control register 78 is performed by the subtraction of the address by an address subtracting unit 90. Therefore, the maximum value of the head address is fixedly stored in the start head address register 75. On the other hand, a minimum value register 92 is provided as a reference for the address comparing unit 86 and the minimum value of the head address is stored. When a mode setting is performed to the automatic switching mode setting register 82 by the serial transfer for the serial interface unit 72, the automatic head switching mode is validated. The maximum value of the head address in the start head address register 75 is first stored into the head address control register 78 through the selectors 74 and 76. The head selection signal E10 of the head 18-4 is outputted to the head selecting circuit 52. Synchronously with the switching from the assertion to the negation of the write gate signal E8, subsequently, the address switching unit 84 makes the address subtracting unit 90 operative. The present head address of the head address control register 78 is subtracted by "1" and the resultant head address is again stored through the selector 76. Therefore, the head address decreases by "1" and the head 18-3 is selected. In a manner similar to the above, the head address is sequentially subtracted. When the head address coincides with the minimum value by the address comparing unit 86, the maximum value of the start head address register 75 is subsequently stored into the head address control register 78 due to the control by the selector 76. The processing routine is returned to the selection of the head 18-4. The other operations are similar to those in the embodiment of FIGS. 7A to 7G except a point that the head address is sequentially switched from the maximum value to the minimum value as mentioned above.

Figure 11:
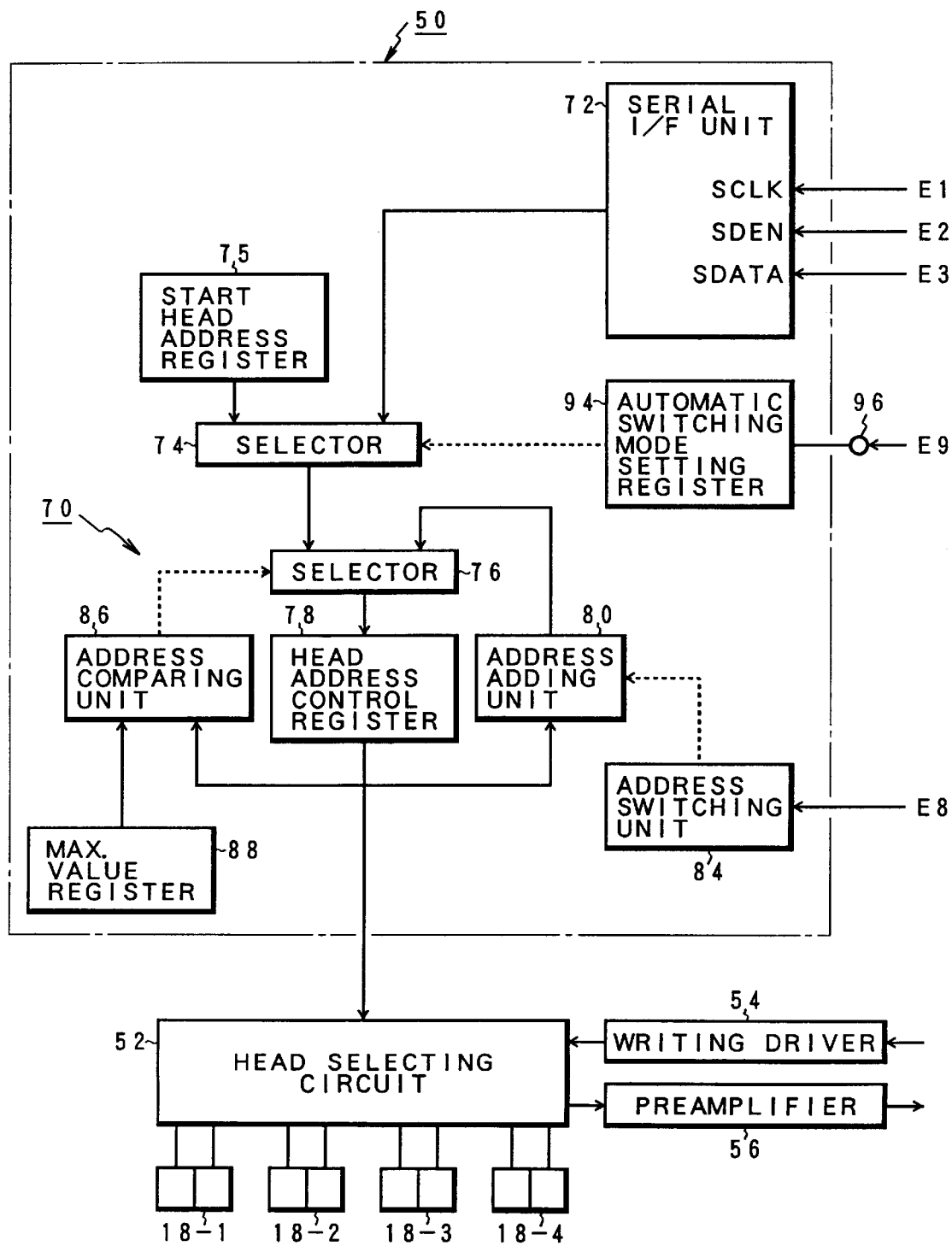
FIG. 11 is a functional block diagram of the control register circuit in FIG. 4 for setting the automatic head control mode according to a signal polarity.

FIG. 11 shows another embodiment of the automatic head switching control unit 70 in FIG. 1 and is characterized in that the setting of the automatic head switching mode is not performed by the serial transfer of the serial interface unit 72 but is directly performed by an automatic head switching mode setting signal E9 from the control board 12. For this purpose, a terminal 96 to input the automatic head switching mode setting signal E9 from the outside is newly provided on the head IC 14 side, thereby inputting the signal E9 from the terminal 96 to an automatic switching mode setting unit 94. The automatic switching mode setting unit 94 discriminates a polarity of the signal E9 to the terminal 96. For example, the signal E9 ordinarily has a positive polarity. When it is changed to a minus polarity, the automatic switching mode setting unit 94 sets the automatic head switching mode. In the case where the setting of the automatic head switching mode in the head IC 14 is enabled in a hardware manner as mentioned above, if the servo writing is completed at the normal stage, by physically disconnecting the electrical connection to the terminal 96, an error such that the head IC 14 is switched to the automatic head switching mode in a state where the user uses the apparatus and an erroneous head automatic selection is performed can be certainly prevented. In the case where the signal line connection to the terminal 96 is left after the end of the servo writing, the setting control of the automatic head switching mode by the serial transfer for the head IC 14 is inhibited by the servo writing processing unit 48 of the MCU 28 in FIG. 1 through the control logic circuit 34.

Figure 12:
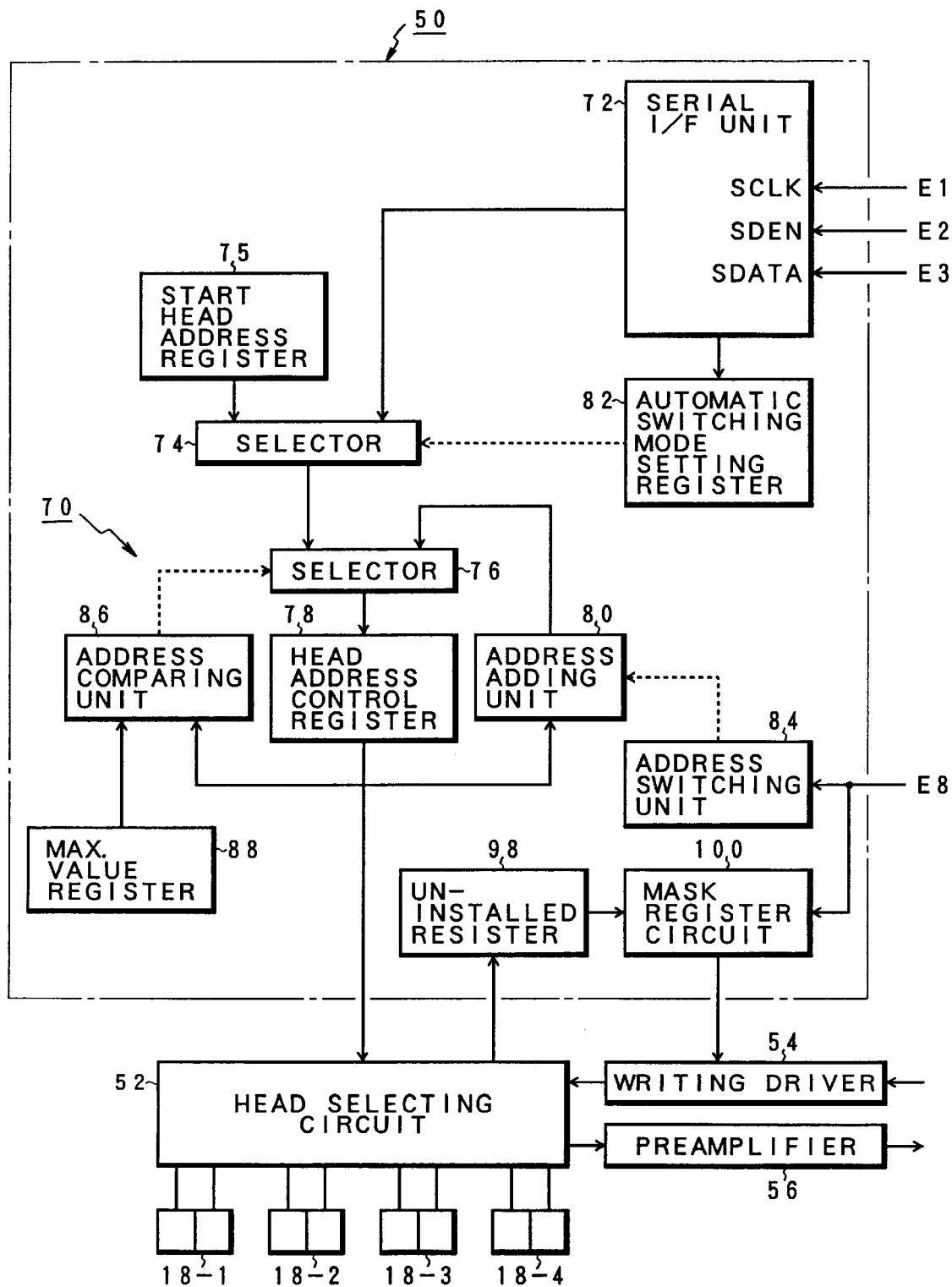
FIG. 12 is a functional block diagram of the control register circuit in FIG. 4 for inhibiting the writing operation of uninstalled heads.

FIG. 12 shows another embodiment of the automatic head switching control unit 70 in FIG. 6 and is characterized in that the processes for the uninstalled heads are executed on the head IC 14 side. Although the automatic head switching control unit 70 provided for the control register circuit 50 is fundamentally the same as that in the embodiment of FIG. 6, an uninstalled register 98 and a mask register circuit 100 are further provided. The uninstalled register 98 checks physical connecting states of the heads 18-1 to 18-4 connected to the head selecting circuit 52 at the time of turn-on of the power source and shows the uninstallation in correspondence to the bits. For example, when the number of heads which can be installed in the head IC 14 is equal to 8, the uninstalled register 98 is an 8-bit register and installs the four heads 18-1 to 18-4 as shown in the diagram. When remaining heads 18-5 to 18-8 are not installed, the uninstalled register 98 is set to "1110000". The mask register circuit 100 detects the switching from the assert to the negate of the write gate signal E8 for the address switching unit 84, shifts the position of bit "1" with respect to 8 bits, and gets the AND with the bit of the uninstalled register 98 corresponding to the shift position of bit "1". In this instance, if the heads are not installed, an AND input of the mask register circuit 100 is set to "10" and an AND output "0" of the mask register circuit 100 is outputted to the writing driver 54, thereby inhibiting the writing operation of the writing driver 54. Thus, when the head selecting circuit 52 is switched to the uninstalled heads, since the writing driver 54 does not operate, even if the write data for the servo information is inputted, it is not supplied to the head selecting circuit 52. The writing operation is not performed.

On the other hand, as for the installed heads, the corresponding bit of the uninstalled register 98 is bit "1", the AND input of the mask register circuit 100 is equal to "11" and the AND output of the mask register circuit 100 to the writing driver 54 is equal to "1". The writing driver 54 operates and a write current according to the write data is supplied to the installed head selected at that time, thereby enabling the servo information to be written.

Figure 13:
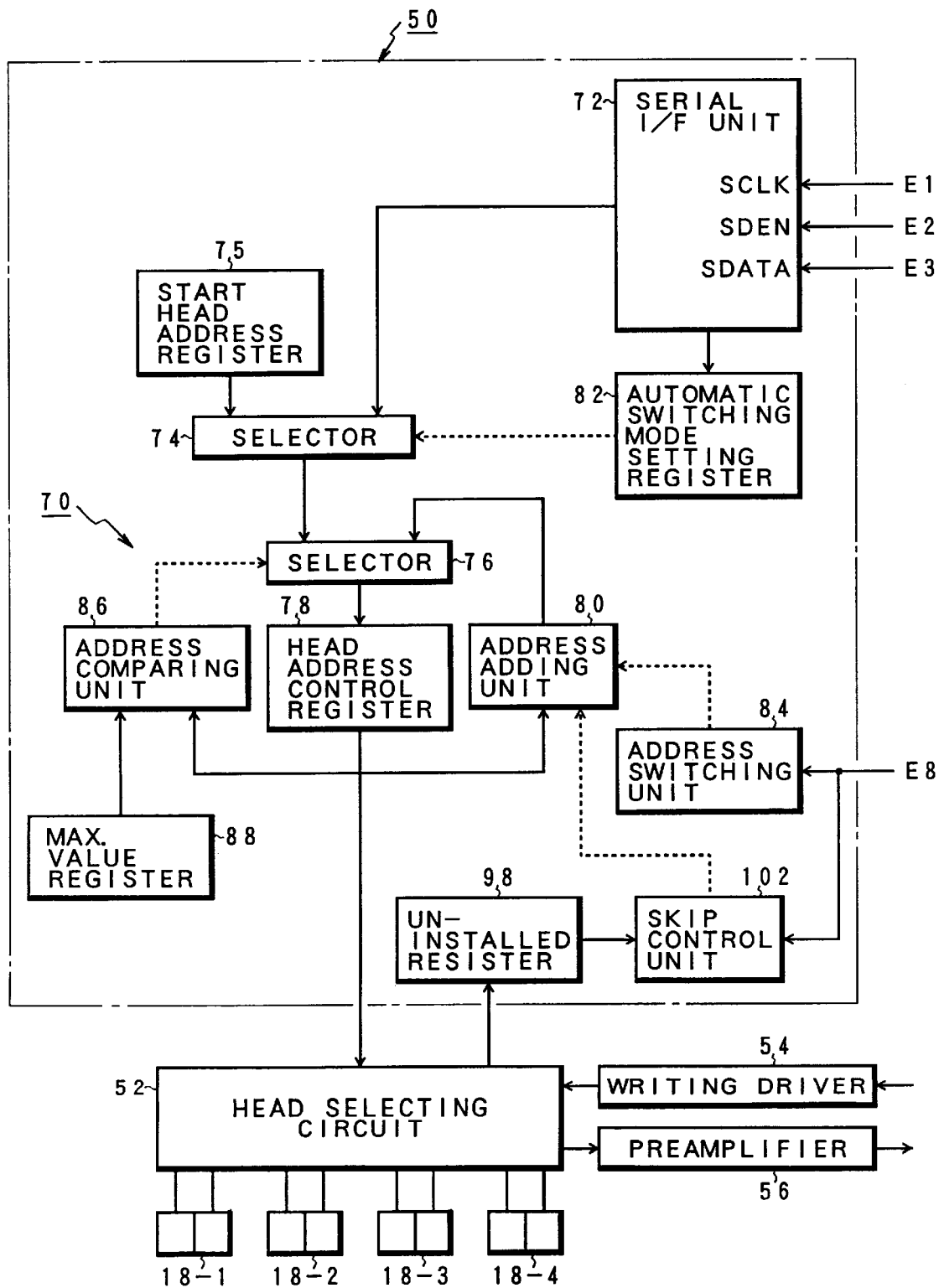
FIG. 13 is a functional block diagram of the control register circuit in FIG. 4 for skipping addresses of uninstalled heads.

FIG. 13 shows another embodiment of the automatic head switching control unit 70 to execute the processes for the uninstalled register on the head IC 14 side. A skip control unit 102 is provided in place of the mask register circuit 100 in FIG. 12. The skip control unit 102 refers to the uninstalled register 98 every switching timing when the write gate signal E8 is switched from the assert to the negate. In case of the uninstallation, the address adding unit 80 is skipped so as to obtain the address of the next installed head. Therefore, even if there are uninstalled heads in part of a plurality of heads, the head switching is continuously performed with respect to the installed register without being aware of the uninstalled register and the servo information can be written.

As mentioned above, according to the head IC and recording apparatus of the invention, if the automatic head switching mode is set and the writing operation is executed by the write gate signal, the head address is automatically switched by using the end of the execution of the writing operation as a trigger. The head switching can be performed without being accompanied with the data transfer by the serial interface, so that the head switching time can be remarkably reduced. Therefore, even in the head IC having the serial transfer function, the high speed servo writing such that all of the heads are switched at one servo frame interval and the servo information is sequentially written onto the different medium surfaces while shifting the recording positions can be certainly performed. The number of dedicated writing facilities which need the clean room and are installed can be reduced and the costs can be decreased.

In the above embodiments, although the state where the head IC 14 is installed in the disk enclosure 10 of the disk drive as shown in FIG. 1 has been described as an example, the invention also provides the head IC 14 itself. Although the automatic head switching control in the above embodiments relates to the servo writing as an example, if necessary in the other writing or reading, the automatic head switching can be similarly performed in a short time. Further, the invention incorporates many various modifications within a scope without departing from the objects and advantages of the invention. The invention is not limited by the numerical values shown in the embodiments.

What is claimed is:

1. A circuit for recording and reproducing information by switching a plurality of heads arranged in correspondence to a plurality of medium surfaces, comprising:
   a serial interface unit for receiving a register address and control data serially transferred from an outside;
   a head address control register which is designated by said register address received by said serial interface unit, stores said control data, and outputs a head selection signal on the basis of said control data; and
   an automatic head switching control unit for, when a setting of an automatic head switching mode is received from the outside, automatically switching said head address control register synchronously with a write gate signal to instruct a writing operation from the outside and for sequentially outputting head selection signals to said plurality of heads.

2. A circuit according to claim 1, wherein when servo information is written to said plurality of recording medium surfaces, said automatic head switching control unit receives the setting of said automatic head switching mode from the outside.

3. A circuit according to claim 1, wherein said automatic head switching control unit uses a minimum value of head addresses as an initial value, increases said head address one by one at every timing when said write gate signal becomes false, and when said write gate signal becomes false in the case where said head address is equal to a maximum value corresponding to the number of heads which can be installed, said automatic head switching control unit sets a next head address to said minimum value.

4. A circuit according to claim 1, wherein said automatic head switching control unit uses a maximum value of head addresses corresponding to the number of heads which can be installed as an initial value and decreases said head address one by one at every timing when said write gate signal becomes false, and when said write gate signal becomes false in the case where said head address is equal to a minimum value of said head addresses, said automatic head switching control unit sets a next head address to said maximum value.

5. A circuit according to claim 1, wherein at a timing when said write gate signal to instruct the writing operation becomes true, said automatic head switching control unit makes a writing driver operative and supplies a write current to the head whose head address has been switched.

6. A circuit according to claim 1, wherein said automatic head switching control unit has a control register for setting an automatic switching mode, designates said automatic switching mode setting control register by the register address received by said serial interface, stores the received control data, and sets and resets said automatic head switching mode on the basis of said control data.

7. A circuit according to claim 1, wherein said automatic head switching control unit comprises:
   a terminal for receiving an input of a setting signal of said automatic head switching mode from the outside; and
   a mode setting unit for setting and resetting said automatic head switching mode on the basis of a signal polarity of said terminal.

8. A circuit according to claim 1, wherein said automatic head switching control unit recognizes installation and uninstallation of said plurality of heads and, when uninstalled heads are selected by a switching of a head address by said write gate signal, said automatic head switching control unit inhibits the writing operation for said uninstalled heads.

9. A circuit according to claim 1, wherein said automatic head switching control unit recognizes installation and uninstallation of said plurality of heads and, upon switching of head addresses by said write gate signal, said automatic head switching control unit skips head addresses of the uninstallation and does not select the uninstalled heads.

10. A recording apparatus having a head IC for recording and reproducing information by switching a plurality of heads arranged in correspondence to a plurality of medium surfaces and a control board for recording and reproducing information to/from a recording medium by the heads through said head IC, wherein
   said head IC comprises:
   a serial interface unit for receiving a register address and control data which are serially transferred from said control board;
   a head address control register which is designated by said register address received by said serial interface unit, stores said control data, and outputs a head selection signal on the basis of said control data; and an automatic head switching control unit for, when a setting of an automatic head switching mode is received from an outside, automatically switching said head address control register synchronously with a write gate signal to instruct a writing operation from said control board and for sequentially outputting head selection signals to said plurality of heads, and said control board has a servo writing processing unit for setting the automatic head switching mode into said head IC, sequentially selecting all of the heads, and sequentially writing servo information to each of the corresponding recording medium surfaces in one-servo sampling period.

11. An apparatus according to claim 10, wherein said servo writing processing unit of said control board has an uninstalled head table in which uninstalled heads have been registered and ignores a write error which occurs in head addresses registered in said uninstalled table.

12. An apparatus according to claim 10, wherein until the writing of the servo information for all cylinders of said plurality of medium recording surfaces by the sequential selection of all of the heads is completed, said servo writing processing unit of said control board inhibits the switching of a head address for said head IC using said serial interface unit.

13. An apparatus according to claim 10, wherein when the servo information is written to said plurality of recording media, said automatic head switching control unit of said head IC receives the setting of said automatic head switching mode from the outside.

14. An apparatus according to claim 10, wherein said automatic head switching control unit of said head IC sets a minimum value of head addresses to an initial value and increases said head address one by one at every timing when said write gate signal becomes false, and when said write gate signal becomes false in the case where said head address is equal to a maximum value corresponding to the number of heads which can be installed, said automatic head switching control unit sets a next head address to said minimum value.

15. An apparatus according to claim 10, wherein said automatic head switching control unit of said head IC sets a maximum value of head addresses corresponding to the number of heads which can be installed to an initial value and decreases said head address one by one at every timing when said write gate signal becomes false, and when said write gate signal becomes false in the case where said head address is equal to a minimum value of the head addresses, said automatic head switching control unit sets a next head address to said maximum value.

16. An apparatus according to claim 10, wherein said automatic head switching control unit of said head IC makes a writing driver operative at a timing when said write gate signal to instruct the writing operation becomes true and supplies a write current to the head whose head address has been switched.

17. An apparatus according to claim 10, wherein said automatic head switching control unit of said head IC has a control register for setting an automatic switching mode, designates said automatic switching mode setting control register by the register address received by said serial interface, stores the received control data, and sets and resets said automatic head switching mode on the basis of said control data.

18. An apparatus according to claim 10, wherein said automatic head switching control unit of said head IC comprises:

a terminal to receive an input of a setting signal of said automatic head switching mode from the outside; and a mode setting unit for setting and resetting said automatic head switching mode on the basis of a signal polarity of said terminal.

19. An apparatus according to claim 10, wherein said automatic head switching control unit of said head IC recognizes installation and uninstallation of said plurality of heads and, in the case where the uninstalled heads are selected by a switching of head addresses by said write gate signal, said automatic head switching control unit inhibits the writing operation for said uninstalled heads.

20. An apparatus according to claim 10, wherein said automatic head switching control unit of said head IC recognizes installation and uninstallation of said plurality of heads and upon switching of head addresses by said write gate signal, said automatic head switching control unit skips the head addresses of the uninstallation and does not select the uninstalled heads.

* * * * *